United States Patent
Bastian, II

(10) Patent No.: US 7,084,738 B2
(45) Date of Patent: Aug. 1, 2006

(54) INVENTORY SYSTEM WITH IMAGE DISPLAY

(75) Inventor: William A. Bastian, II, Carmel, IN (US)

(73) Assignee: ASAP Automation, LLC, Indianapolis, IN (US)

(*) Notice: Subject to any disclaimer, the term of this patent is extended or adjusted under 35 U.S.C. 154(b) by 108 days.

(21) Appl. No.: 10/643,197

(22) Filed: Aug. 18, 2003

(65) Prior Publication Data

US 2004/0207512 A1     Oct. 21, 2004

Related U.S. Application Data

(63) Continuation-in-part of application No. 09/734,360, filed on Dec. 11, 2000, now Pat. No. 6,650,225.

(51) Int. Cl.
*H04Q 9/00* (2006.01)

(52) U.S. Cl. .................................. 340/5.92; 705/22

(58) Field of Classification Search .............. 340/5.92, 340/825.49, 825.52; 700/213; 705/22
See application file for complete search history.

(56) References Cited

U.S. PATENT DOCUMENTS

| | | |
|---|---|---|
| 3,532,184 A | 10/1970 | Blake |
| 3,716,697 A | 2/1973 | Weir |
| 3,739,339 A | 6/1973 | Hillhouse |
| 3,770,941 A | 11/1973 | Gechele et al. |
| 3,908,800 A | 9/1975 | Drapeau |
| 4,237,598 A | 12/1980 | Williamson |
| 4,332,012 A | 5/1982 | Sekine et al. |
| 4,346,453 A | 8/1982 | Drapeau et al. |
| 4,419,734 A | 12/1983 | Wolfson et al. |
| 4,521,677 A | 6/1985 | Sarwin |
| 4,598,459 A | 7/1986 | Klink et al. |
| 4,625,396 A | 12/1986 | Ahmed et al. |
| 4,646,245 A | 2/1987 | Prodel et al. |
| 4,669,047 A | 5/1987 | Chucta |
| 4,821,197 A | 4/1989 | Kenik et al. |
| 4,827,395 A | 5/1989 | Anders et al. |
| 4,942,534 A | 7/1990 | Yokoyama et al. |

(Continued)

FOREIGN PATENT DOCUMENTS

EP     0 971 303 A2     1/2000

(Continued)

OTHER PUBLICATIONS

Ditlea, Steve, The Electronic Paper Chase, ScientificAmerican.com, Nov. 16, 2001.

(Continued)

*Primary Examiner*—Wendy R. Garber
*Assistant Examiner*—Matsuichiro Shimizu
(74) *Attorney, Agent, or Firm*—Woodard, Emhardt, Moriarty, McNett & Henry LLP

(57) ABSTRACT

A pick/put to display (PTD) device includes an image display that allows the PTD device to display images related to a product, such as a picture of the product or an instructional video. By having the capability to display images of the product, the PTD device is able to reduce the risk that the wrong product will be picked or placed in a storage location. The image display further allows the PTD device to display arrows that can point in a multitude of directions. With the capability of having arrows point in numerous directions, a single PTD device is able to service multiple storage locations, thereby reducing the number of PTD devices needed. The PTD device is further capable of downloading and playing sound files for a product so that audio instructions or alerts can be played.

46 Claims, 7 Drawing Sheets

U.S. PATENT DOCUMENTS

| | | | |
|---|---|---|---|
| 5,029,095 | A | 7/1991 | Kenik et al. |
| 5,097,421 | A | 3/1992 | Maney et al. |
| 5,151,684 | A * | 9/1992 | Johnsen .................. 340/568.1 |
| 5,406,024 | A | 4/1995 | Shioda |
| 5,412,576 | A | 5/1995 | Hansen |
| 5,414,634 | A | 5/1995 | Morgan et al. |
| 5,505,473 | A | 4/1996 | Radcliffe |
| 5,537,126 | A | 7/1996 | Kayser et al. |
| 5,742,238 | A | 4/1998 | Fox |
| 5,781,443 | A | 7/1998 | Street et al. |
| 5,793,963 | A | 8/1998 | Tapperson et al. |
| 5,812,986 | A * | 9/1998 | Danelski ...................... 705/22 |
| 5,827,753 | A * | 10/1998 | Huang et al. ................. 438/24 |
| 5,875,434 | A | 2/1999 | Matsuoka et al. |
| 5,910,653 | A * | 6/1999 | Campo ................. 250/214 AL |
| 5,963,133 | A | 10/1999 | Monjo |
| 5,979,757 | A | 11/1999 | Tracy et al. |
| 6,109,568 | A | 8/2000 | Gilbert et al. |
| 6,249,263 | B1 | 6/2001 | Kayser et al. |
| 6,269,342 | B1 | 7/2001 | Brick et al. |
| 6,307,919 | B1 | 10/2001 | Yoked |
| 6,388,561 | B1 | 5/2002 | Tuttle |
| 6,445,370 | B1 | 9/2002 | Goodwin, III |
| 6,507,279 | B1 | 1/2003 | Loof |
| 6,513,016 | B1 | 1/2003 | Freeny, Jr. |
| 6,543,688 | B1 | 4/2003 | Massaro |
| 6,552,663 | B1 | 4/2003 | Swartzel et al. |
| 6,557,760 | B1 | 5/2003 | Goodwin, III |
| 6,624,757 | B1 | 9/2003 | Johnson |
| 6,639,990 | B1 * | 10/2003 | Astrin et al. ................ 381/315 |
| 2001/0054005 | A1 | 12/2001 | Hook et al. |
| 2003/0040922 | A1 | 2/2003 | Bodin |
| 2003/0136832 | A1 | 7/2003 | Massaro |

FOREIGN PATENT DOCUMENTS

| | | |
|---|---|---|
| EP | 1 168 885 A2 | 1/2002 |
| EP | 1 153 317 B1 | 3/2003 |
| JP | 2000118641 * | 4/2000 |
| JP | 2001031218 A2 | 2/2001 |
| JP | 2001297568 | 10/2001 |
| JP | 2002037417 A2 | 2/2002 |
| JP | 2002065418 A2 | 3/2002 |
| JP | 2002215012 A2 | 7/2002 |
| JP | 2002342727 A2 | 11/2002 |
| WO | WO 00/43944 | 7/2000 |
| WO | WO 01/33526 A1 | 5/2001 |
| WO | WO 03/043709 A1 | 5/2003 |

OTHER PUBLICATIONS

Graham, Sarah, Scientists Fabricate Pliable Electronic Display, ScientificAmerican.com, May 8, 2003.

Eink.Com, Cross-Section of Electronic-Ink Microcapsules, E Ink Coporation, Nov. 3, 2003, © 2002 (http://www.eink.com/technology/index.html).

Product Literature, Gyricon LLC, SmartSign™ Part of the Gyricon family of networked signs, © 2003.

Exacta Light Directed Pick (LDP) User Guide for Gage Marketing for Exacta Release 2.X Configured for Pick and Pass, Effective Apr. 5, 2000, ASAP Automation, Inc. 35 pages.

ASAP Warehouse Management Software "Exacta" Automation for Supply Chain Logistics, 46 pages.

7000 Series CAP-AI System 7000 Series, "Ultimate Man-Machine Distribution System", 4 pages.

"ROK 101 007 Bluetooth Module" by Ericsson, 21 pages.

Bluetooth Radio Specification, Part A, Version 1.0B, 20 pages.

"RFID Solutions from Symbol Technologies", Application Brief, Nov. 1999, 2 pages.

Kooser, Amanda C., "It's in the Air: Laptops and palmtops talking without wires? It's Bluetooth inside.", *Entrepreneur* Jul. 2000, 1 page.

Internet printout Jul. 13, 2000, IPCI Innovative Picking Technologies, Inc., "Snap-in" BUS, 2 pages.

Internet printout Jul. 13, 2000, IPCI Innovative Picking Technologies, Inc., "System Operation," 2 pages.

Internet printout Jul. 12, 2000, Order Picking systems "Pick-To-Trolley System®: Combination of RackRunner® With PTTS," 1 page.

Internet printout Jul. 12, 2000, Order Picking Systems, "RackRunner Order Picking System: Introducing Industry to Order Fulfillment in the 21$^{st}$ Century," 2 pages.

Internet printout Jul. 6, 2000, Advanced Tracking System "IridNet™", 2 pages.

Internet printout Jul. 13, 2000, "Accupic Pick-to-light", 2 pages.

Internet printout Jul. 11, 2000, Sourcewire.com, "Symbol Wireles Technology Selected for J.C. Penney State-of-the-Art Distribution Center", 2 pages.

Internet printout Jul. 10, 2000, Catalyst Warehouse Management Systems, 4 pages.

Internet printout Jul. 13, 2000, Eli Lilly & Company "Key Systenm Technologies", 2 pages.

Internet printout Jul. 13, 2000, "Accupic Mobile Batch Pick Carts", 2 pages.

Internet printout Jul. 13, 2000, "Carton Flow Pick-to-Light Systems: A Stimulation Analysis For Batch vs. Single Order Pick Methodologies", 7 pages.

Internet printout Jul. 13, 2000, Data Control Systems, Inc. "CartRite®: Mobile RF-Cart/Batch Picking System", 3 pages.

Internet printout Jul. 10, 2000, Automation Associates, "AAI Warehouse Management System", 2 pages.

Internet printout Jul. 10, 2000, "IntelliTrack RF", 2 pages.

Internet printout Jul. 11, 2000, "RFID Solutions from Symbol Technologies", 4 pages.

Internet printout Jul. 10, 2000, e-Warehouse, "The RF/PC Module", 2 pages.

Internet printout Jul. 13, 2000, "Radio Frequency Data Communications (Overview)", 6 pages.

Internet printout Jul. 10, 2000, Majure Data OnLine, "RF Navigator", 2 pages.

Internet printout Jul. 10, 2000, Automation Associates, "Spectrum24 High-Performance Wireless LAN", 4 pages.

* cited by examiner

INVENTORY SYSTEM WITH IMAGE DISPLAY

CROSS-REFERENCE TO RELATED APPLICATIONS

The present application is a continuation-in-part of U.S. patent application Ser. No. 09/734,360, filed Dec. 11, 2000, now U.S. Pat. No. 6,650,225, which is hereby incorporated by reference in its entirety.

BACKGROUND

The present invention generally concerns material handling systems, and more specifically, but not exclusively concerns an integrated material handling systems with image display capabilities.

To manage and control inventories, companies have been adopting automated light directed inventory systems so as to reduce paperwork and increase efficiency. In a usual light directed inventory system, pick/put to light (PTL) devices are used to direct an operator's attention to a particular bin, shelf location, or carousel in a warehouse. For instance, a light on the PTL device may illuminate so that the operator knows which storage location needs to be serviced. Once at the desired storage location, the operator can add (put), remove (pick) or count the required items at the storage location.

Although PTL devices have increased supply chain efficiency, there is always the risk that items may be moved or bins can be rearranged so that the operator removes or adds the wrong item. Since typical PTL devices at the most only display the desired quantities of items, the operator can never be sure that the right item handled. These and other types of handling errors can sometimes create dire circumstance, especially in the medical industry. For example, if an employee of a pharmaceutical company or hospital retrieves the wrong medication, a patient's health may be placed in jeopardy.

Cost is always a concern for any type of inventory system. Even though the PTL device systems improve efficiency, the initial purchase price and maintenance costs associated the PTL devices may offset any economic advantage gained by their installation. Typical light directed inventory systems require a PTL device to be positioned at every storage location so that an operator is able to identify the storage location. Even in a modestly sized warehouse, the number of PTL devices needed to service each location can become quite large. In addition, some storage locations are not suitable to have PTL devices mounted close by. Thus, there remains a need for improvement in this field.

SUMMARY

One form of the present invention concerns a technique in which a pick/put to display device is provided with an image display and an indicator light. The indicator light is illuminated to alert an operator of a service to be performed on an item at a storage location. A service instruction for the item is displayed on the image display, and an image of the item is displayed on the image display.

Another form concerns a technique for reducing the number of pick/put to display devices needed for a storage area. A pick/put to display device with an image display is positioned between a first storage location and a second storage location. A first arrow pointing toward the first storage location and a first instruction for servicing the first storage location are displayed on the image display. A second arrow pointing toward the second storage location and a second instruction for servicing the second storage location are displayed on the image display.

A further form concerns a technique in which an operator is alerted of a service to be performed on an item at a storage location with a pick/put to device that has an image display. Instructions concerning the item at the storage location are displayed on the image display. An image concerning the item at the storage location is displayed on the image display.

A further form concerns a system that includes a pick/put to display device that is positioned proximal a storage location. The pick/put to display device includes a processor that is operable to download an instruction and an image that concern an item associated with the storage location. Memory is operatively coupled to the processor, and an indicator light is operatively coupled to the processor to alert an operator of a servicing task for the item at the storage location. An image display is operatively coupled to the processor to display the instruction and the image concerning the item at the storage location.

In another form, a system includes a first storage location configured to store a first item and a second storage location configured to store a second item. A pick/put to display device is positioned between the first storage location and the second storage location to handle service instructions for both the first storage location and the second storage location. The pick/put to display device has an image display configured to display a first arrow that points toward the first storage location and a second arrow that points to the second storage location.

Other forms, embodiments, objects, features, advantages, and aspects of the present invention shall become apparent from the detailed drawings and description contained herein.

DESCRIPTION OF SELECTED EMBODIMENTS

Figure 1:
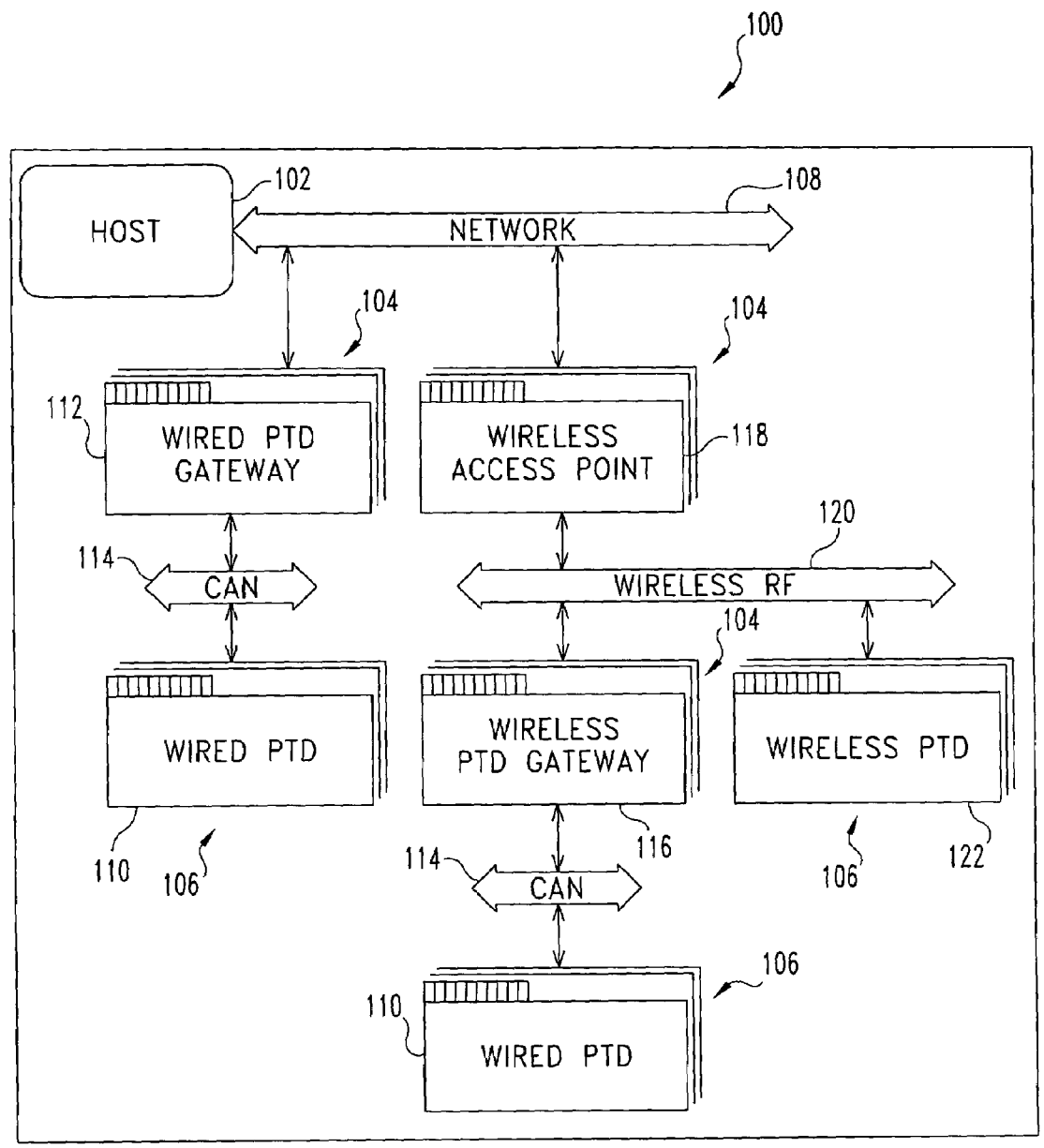
FIG. 1 is a diagrammatic view of an inventory system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

FIG. 1 depicts, with a diagram, an inventory management system 100 according to one embodiment of the present invention. The system 100 includes at least one host 102, one or more pick/put to display (PTD) gateways (or routers) 104, and one or more pick/put to display (PTD) devices 106. The host 102 stores information about inventoried items and manages orders for the items. In one embodiment, the host 102 includes a file server that stores inventory information, and in one particular form, the host 102 includes a personal computer. As should be appreciated, in other embodiments, multiple computers can be operatively coupled together to form the host 102. It nevertheless contemplated that the host 102 can include other types of computing devices as would occur to those skilled in the art. The host 102 and the PTD devices 106 communicate with one another by sending messages over a network 108. For example, the host 102 can send a message to one of the PTD devices 106 so that the PTD device 106 alerts an operator of a servicing task for a specific item, such as picking a predefined number of items from a bin.

The PTD devices 106 are normally located near one or more inventory storage locations, and the PTD devices 106 are used to alert operators of tasks and provide instructions concerning the tasks. As will be discussed in greater detail below, the PTD devices 106 according to the present invention are able to provide task or service instructions for multiple inventory locations and/or items, thereby reducing the number of PTD devices 106 needed in the system 100. As illustrated in FIG. 1, the host 102 and the PTD devices 106 communicate with one another via the PTD gateways 104. In one embodiment, the gateway includes a computer. However, as should be appreciated, the PTD gateways 104 include any type of computer gateway as would occur to those skilled in the art. The PTD gateways 104 communicate with the server 102 through the network 108. The network 108 includes any type of communication network as would occur to those skilled in the art. By way of non-limiting examples, the network 108 can include the Internet and/or one or more other Wide Area Networks (WAN), a Local Area Network (LAN), a proprietary network such as provided by America On Line, Inc., or a combination of these, to name a few.

In the illustrated embodiment, the PTD devices 106 communicate to the server 102 through a wired and/or wireless connection. Referring to FIG. 1, the PTD devices 106 include a wired PTD device 110 that is operatively coupled to a wired PTD gateway 112 through a controller area network (CAN) 114. In another illustrated form, the wired PTD device 110 is operatively coupled through CAN 114 to a wireless PTD gateway 116. The wireless PTD gateway 116 communicates with a second wireless PTD gateway 116, wireless access point 118, through a wireless network 120. The PTD devices 106 further include a wireless PTD device 122 that communicates with the wireless access point 118 through the wireless network 120. As should be appreciated, the inventory system 100 in other embodiments can include additional components, exclude selected components and/or can be configured in a different manner. For example, the system 100 in other embodiments can exclusively include wired PTD devices 110 or wireless PTD devices 122.

Figure 2:
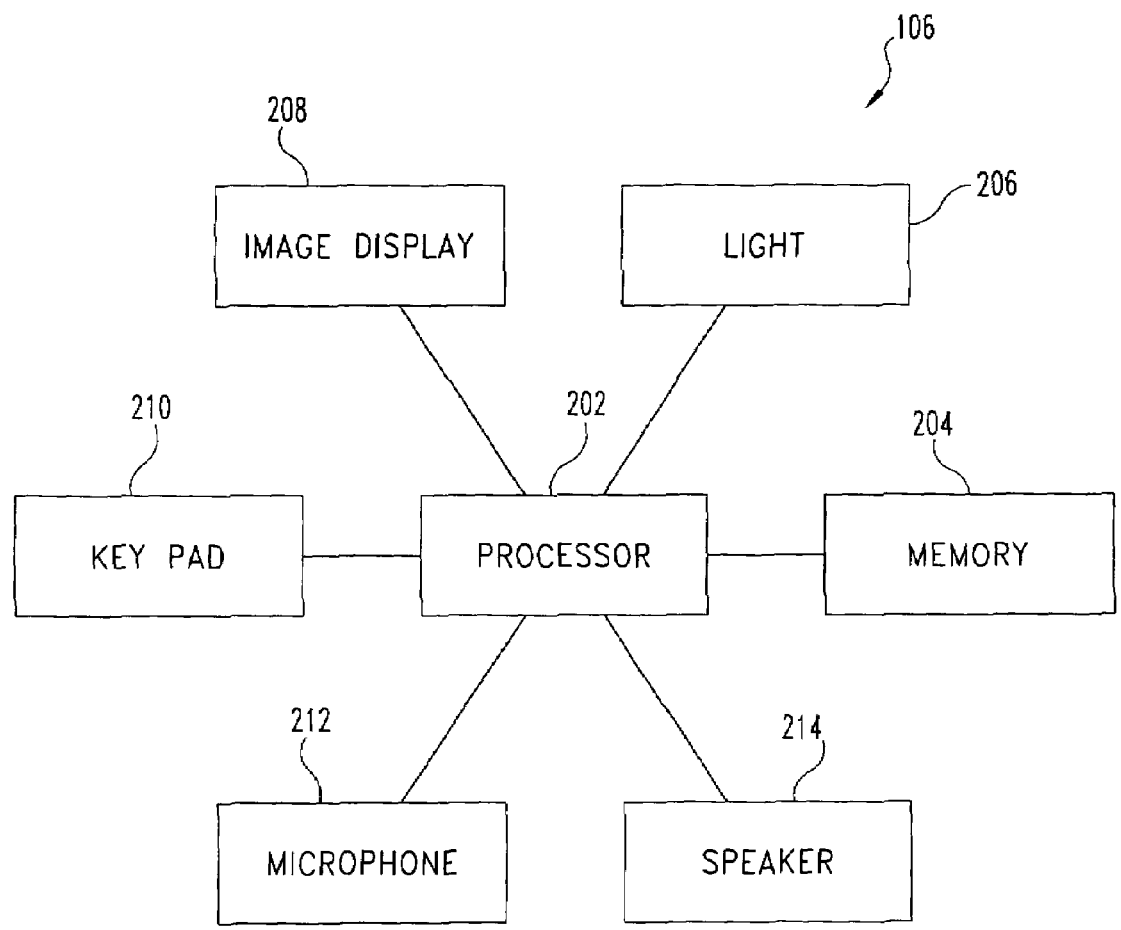
FIG. 2 is a diagrammatic view of a pick/put to display (PTD) device used in the FIG. 1 system.

A diagrammatic view of one of the PTD devices 106 is illustrated in FIG. 2. As depicted, the PTD device 106 includes a processor 202 for controlling the operation of the PTD device 106 and processing communications with the host 102. The processor 202 may be comprised of one or more components. For a multi-component form of the processor 202, one or more components can be located remotely relative to the others, or configured as a single unit. Furthermore, processor 202 can be embodied in a form having more than one processing unit, such as a multiprocessor configuration, and should be understood to collectively refer to such configurations as well as a single-processor-based arrangement. One or more components of processor 202 may be of the electronic variety defining digital circuitry, analog circuitry or both. Processor 202 can be of a programmable variety responsive to software instructions, a hardwired state machine, or a combination of these.

As depicted in FIG. 2, the processor 202 communicates with and/or controls a number of components in the PTD device 106. These components in the illustrated embodiment include at least each one of the following: memory 204; an indicator light 206; an image display 208; a manual input device or key pad 210; a microphone 212; and a speaker 214 that are each operatively coupled to the processor 202. It is contemplated that in other embodiments at least some of these components can be directly operatively coupled to one another and/or selected components can be added or removed. Among its many functions, memory 204 stores information that is related to inventory storage locations and items, such as images, videos (movies), sound (voice) recordings, file addresses, text instructions, product descriptions and product quantities, to name a few. Memory 204 can include one or more types of solid state electronic memory, magnetic memory, or optical memory, just to name a few. By way of nonlimiting examples, the memory can include solid state electronic random access memory (RAM), sequential access memory (SAM), such as first-in, first-out (FIFO) variety or last-in, first-out (LIFO) variety, programmable read only memory (PROM), electronically programmable read only memory (EPROM), or electronically erasable programmable read only memory (EEPROM); an optical disc memory (such as a DVD or CDROM); a magnetically encoded hard disc, floppy disc, tape, or cartridge media; or a combination of these memory types. In addition, the memory 204 may be volatile, non-volatile, or a hybrid combination of volatile, non-volatile varieties.

The processor 202 illuminates the indicator light 206 to direct the attention of the operator to a selected PTD device 106. The indicator light 206 includes any type of illumination device as would occur to those skilled in the art. By way of nonlimiting examples, the indicator light 206 can include an incandescent light bulb, a fluorescent light bulb, a light emitting diode (LED) or a combination of these. The processor 202 on the image display 208 displays images of items, direction arrows, instructions, quantities and other information. The images displayed on the image display 208 can be animated (such as a video), static, two-dimensional and/or three-dimensional. The image display 208 includes any type of image displaying device as would occur to those skilled in the art. By way of non-limiting examples, the image display 208 can include a liquid crystal type display (LCD), an LED type display, a cathode ray tube (CRT), an organic light emitting diode (OLED) type display, and/or a plasma display, to name just a few. In one embodiment, the image display 208 includes an OLED type display in order to conserve energy in the PTD device 106 and to improve the viewable angle of the image display 208. OLED type displays have a wide viewable angle of approximately one hundred and seventy degrees (170°), which in turn improves the overall visibility of the image display 208 to the operator in a warehouse type environment. With the display capabilities of the image display 208, the PTD device 106 is able to provide instructions for multiple inventory locations, and provide greater flexibility in the format and type of instructions. In the PTD device 106, the image display capabilities of display 208 can reinforce the textual instructions by providing an image of the item to be picked from, put into or counted at an individual storage location. Moreover, animations or videos can be shown on the image display 208 to illustrate techniques for handling and packaging items as well as other information.

The operator interfaces with the PTD device 106 through the keypad 210. It should be understood that the keypad 210 can encompass other types manual input devices, such as a mouse or a digitized pen, for example. The keypad 210 includes one or more buttons that are used by the operator to manually enter information. For example, the operator can change the quantities picked or select menu options with the keypad 210. The operator can also interface with the PTD device 106 vocally via the microphone 212 and receive voice instructions or other audio signals through the speaker 214. For instance, in addition to or as a substitute for the indicator light 206 being illuminated, the speaker 214 can emit a sound, such as a voice command, to direct the attention of the operator to a particular PTD device 106. The vocal/audio interface provided by the microphone 212 and the speaker 214 allows for hands-free operation of the PTD device 106. For instance, in response to a voice instruction from the speaker 214 of the PTD device 106, the operator can audibly instruct the PTD device 106 through the microphone 212 that a task has been completed.

Figure 3:
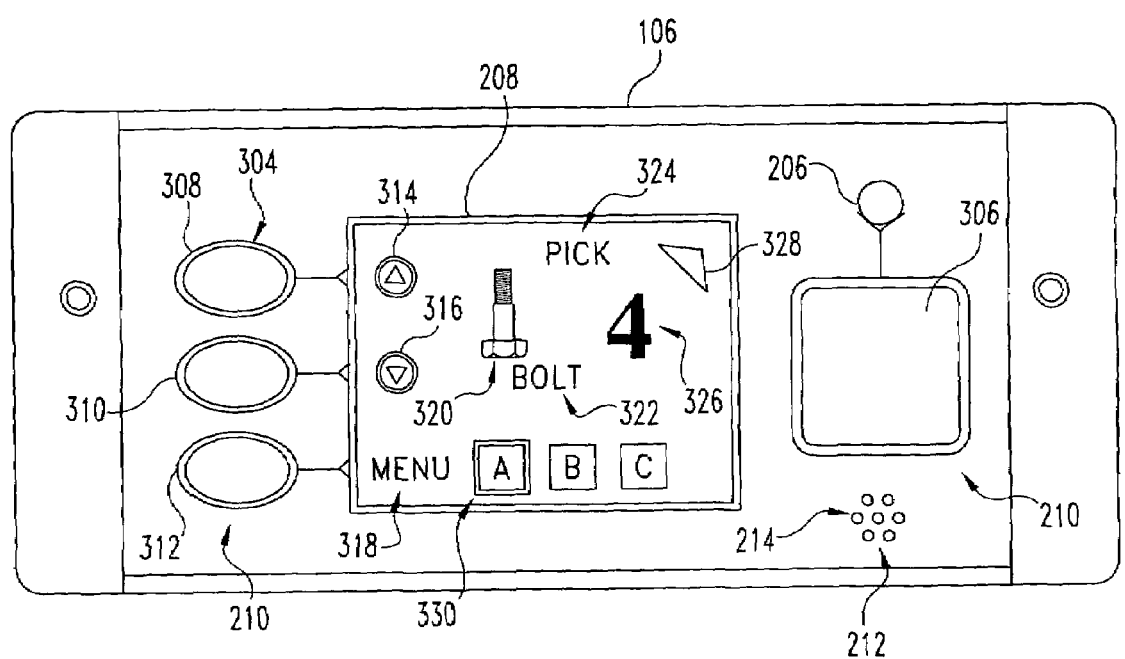
FIG. 3 is a front view of the FIG. 2 PTD device displaying a pick item screen.

A PTD device 106 according to one embodiment of the present invention is illustrated in FIG. 3. As shown, the indicator light 206, image display 208, keypad 210, microphone 212 and speaker 214 are mounted to a housing 302. While not shown, the processor 202 and memory 204 in the embodiment depicted in FIG. 3 are mounted inside the housing 302. In the illustrated embodiment, the keypad 210 includes menu buttons 304 and a task complete button 306. To prevent the wrong buttons from being accidentally pushed, the menu 304 and task complete 306 buttons are positioned on opposite sides of the image display 208. As illustrated, the menu buttons 304 are positioned near the image display 108 so that the menu buttons 304 can be used to navigate a menu system that is displayed on the image display 208. The menu buttons 304 are also used to adjust the actual quantity handled in an order, and the menu buttons 304 can further be used to rotate three dimensional images on the image display 208 or control playback of sounds (voice recordings) and videos (i.e., fast forward and rewind).

In the illustrated embodiment, the menu buttons 304 include first 308, second 310 and third 312 menu buttons. However, it is contemplated that in other embodiments the menu buttons 304 can include more or less buttons than depicted. Referring to FIG. 3, the image display 208 is operable to display increase quantity 314 and decrease quantity 316 indicators, which are positioned near the first 308 and second 310 menu buttons, respectively. By pressing the first menu button 308, the operator is able to increase the quantity, and the operator is able to decrease the quantity by pressing the second menu button 308. In one form, when the first 308 and second 310 buttons are pressed at the same time, the actual quantity is set to zero. In the screen displayed on the image display of FIG. 3, a menu indicator 318 is displayed on the image display 208 proximal the third menu button 312, such that the operator gains access to the menu system of the PTD device 106 by pressing the third menu button 312. Once the particular service task is complete, the operator in one embodiment presses the task complete button 306 in order to notify the PTD device 106 that the task is completed. It is contemplated that in other embodiments the operator can verbally communicate to the PTD device 106 that the task is complete through the microphone 212.

As noted above, the image display 208 gives the PTD device 106 the ability to handle multiple storage locations, and further, gives the PTD device 106 the ability to display images of items or images associated with items so as to reduce handling errors. Ensuring that the correct item is added or removed from a storage location (or counted) can be especially critical in industries that have similar looking items, such as the pharmaceutical industry where pills can look very similar. Furthermore, certain items, such as hazardous or fragile items, may require special handling procedures that are not easily conveyed through text alone, but are easily understood visually. The image display 208 of the present invention has the ability to visually convey such information, thereby reducing many types of inventory/handling problems. By being positioned near the storage location being serviced, the PTD device 106 can be a readily available source of information for the operator. In contrast, typical paper-based, manuals are usually rather large and are centrally located at one location, which in turn discourages their use.

In FIG. 3, the image display 208 shows an image 320 of an item to be picked, which in the illustrated example is a bolt. It should be understood that other types of images 320 can be shown on the image display 208 in conjunction with other types of instructions. For example, the image 320 can be of the package in which the item is packed, additional views of the item, icons, warning signs and instructional pictures or videos for the item. The image display 208 is further configured to display textual information, such as a name or description of an item 322, an instruction 324 (i.e., pick, put, or count) and quantity 326.

In addition, the image display 208 is operable to display a location arrow 328 that indicates the location of where the task is to be performed. As will be appreciated from the discussion below, displaying the location arrow 328 on the image display 208 gives the PTD device 106 the flexibility to provide instructions for multiple storage locations regardless of the position of the storage location relative to the PTD device 106. The image display 208 is further capable of displaying location arrows 328 of different sizes, shapes, colors and/or styles as well allows the locations arrows 328 to be animated. This capability of modifying the location arrows 328 displayed on the image display 208 allows the PTD device 108 to be easily configured for different environmental conditions. For example, if the PTD device 106 is located on an upper shelf of a storage bay, the properties of the location arrow 328 can be adjusted so that the location arrow 328 is easily visible. In another example, to provide directions to a designated PTD device 106 that requires a service to be performed, the location arrows 328 on nearby PTD devices 106 can be animated so as to point and move towards the designated PTD device 106.

The image display 208 is further capable of displaying additional information in order to locate an item. As should be appreciated, individual storage locations can be further subdivided or partitioned to form separate compartments or cells in which different items are stored. As depicted in FIG. 3, the image display 208 is further capable of displaying cell location icons or indicators 330 that indicate the particular cell to service. In the image display 208, the cell icons 330 can be arranged to correspond to the relative locations of cells. For example, the image display 208 in FIG. 3 shows cell icons 330 for cell locations "A", "B" and "C" in a row. The cell icon 330 for cell "A" is highlighted to indicate that, for the storage location where the location arrow 328 points, the operator should pick four (4) bolts from cell "A".

Figure 4:
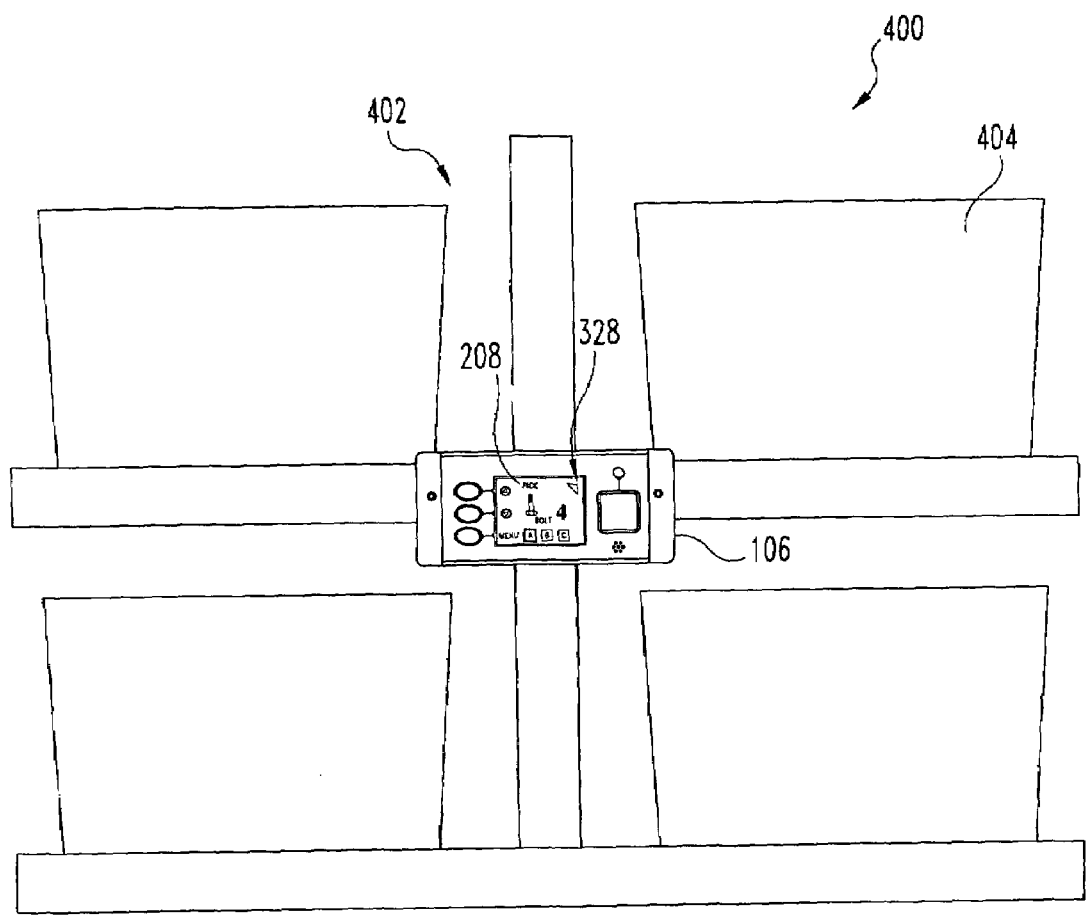
FIG. 4 is a front view of the FIG. 3 PTD device positioned to handle multiple storage locations.

Referring to FIG. 4, an example of an inventory storage system 400 is illustrated in which the PTD device 106 is mounted to service multiple storage or service locations 402 at the same time. Although the embodiment will be described with reference to a shelving unit with bins, it should be appreciated that the PTD device 106 can be used in other types of situations. In the illustrated embodiment, the PTD device 106 is mounted between four (4) storage locations 402, which each contain a bin 404 in which items are stored. To indicate the bin 404 to be serviced, the PTD device 106 displays on the image display 208 the location arrow 328 that points to the desired storage location 402. In the example illustrated in FIGS. 3 and 4, the location arrow 328 points towards the storage bin 404 that is located at the upper, right side of system 400, and the PTD device 106 further indicates that four (4) bolts should be picked from the designated bin 404. It should be understood that, with the added flexibility provided by the image display 208, the PTD device 106 can be easily reconfigured to handle more or less storage locations 402 than is shown. For example, if the layout of a warehouse is changed, the PTD device 106 can be easily re-installed at a different location.

Figure 5:
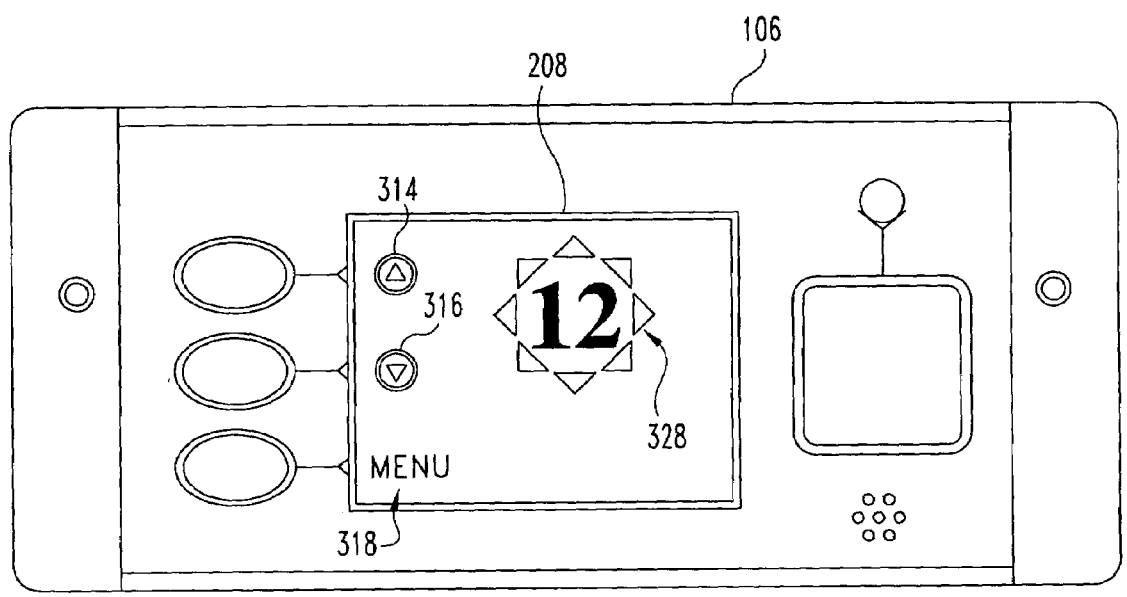
FIG. 5 is a front view of the FIG. 3 PTD device displaying a multiple location arrows screen.

As shown in FIG. 5, the image display 208 is capable of displaying location arrows 328 that accurately point in a multitude of directions. In one embodiment, the image display 328 is capable of displaying location arrows 328 that are able to point throughout a full three hundred and sixty-degree (360°) range. Having the ability to accurately point to storage locations 402 with the location arrows 328 on the image display 208, helps to reduce the chance the operator will mistakenly service the wrong storage location 402. Location arrows 328 are also able to point in non-orthogonal directions so that, if the PTD device 106 were installed closer to one storage location 402 and farther away from others, the location arrow 328 can be adjusted to accurately point toward the actual locations of the storage locations 402.

As previously mentioned, the image display 208 and speaker 214 give the PTD device 106 the ability to display and/or play media content, such as images of items or voice-base instructions, thereby enriching the instructional information available to the operator. A technique for displaying and/or playing media content on the PTD device 106 will now be described with reference to a flow chart 600 in FIG. 6. To aid in understanding the technique, a communication protocol for the inventory management system 100 will be described below. It, however, should be understood that the present invention is not intended to be limited to just the communication protocol described below, and it is contemplated that other types communication protocols are can be used in communications between the host 102 and the PTD device 106.

According to one embodiment of the present invention, extensible markup language (XML) is used in communications between the PTD devices 106 and the host 102. Using XML allows for greater flexibility in system design and improves interoperability. Table 1 below lists a detailed description of the XML tags that are sent by the host 102 to the PTD device. It is contemplated other types of tag names can be used.

TABLE 1

Host to PTD Device

| Tag | Tag Description | Data | Attribute |
|---|---|---|---|
| | | REQUIRED TAGS | |
| SID | Source ID | TCP/IP address for source of message. Required tag. | N/A |
| DID | Device ID | TCP/IP address for destination device. Required tag. | N/A |
| OP | Operation | Operation values:<br>1 = Pick. Pick operations.<br>2 = Put. Put operations.<br>3 = Illuminate. Light device.<br>4 = Count. Count operations.<br>7 = Ping. Receive status of PTD's.<br>8 = Reset. Resets devices.<br>9 = Set Location. Sets menu data.<br>10 = Self test. Runs PTD test.<br>11 = Sleep. Sets to sleep mode.<br>12 = Set ID. Set ID for PTD.<br>13 = Generic FTP<br>Required tag. | B (Beep) X/Y/Z where<br>0 = No beep (default)<br>X = Beep frequency in seconds<br>Y = Timer where beep frequency changes<br>Z = New beep frequency after timer expires.<br>Example: Beep 7/120/2 causes the device to beep every 7 seconds until the device has been illuminated for 2 minutes with no task complete. After the 2 minutes is up, beeps every 2 seconds. |
| | | OPTIONAL TAGS | |
| AFTP | Audio FTP File | FTP file name of the audio file associated with the device and location specified in the message. PTD client will use FTP to connect to the server and download the sound (i.e., .WAV) file. Location is identified by the arrow direction. | A (IP Address) (default = Host IP address)<br>P (Path) (default = login directory) |
| ARW | Arrow | Product association index. An associated Screen Layout file contains screen position (relative to quantity) where arrow displays:<br>1 = TOP(default) | I (Intensity)<br>0 = No display (default)<br>1 = Low intensity on display |

TABLE 1-continued

Host to PTD Device

| Tag | Tag Description | Data | Attribute |
|-----|-----------------|------|-----------|
|  |  | 2 = BOTTOM<br>3 = LEFT<br>4 = RIGHT<br>5 = NE (points northeast)<br>6 = NW (points northwest)<br>7 = SE (points southeast)<br>8 = SW (points southwest)<br>Note: Also provided on location set up to indicate which location info relates to (top, bottom, left, right) for the device. | 2 = Med. Intensity on display<br>3 = High intensity on display<br>S (Size)<br>0 = Small<br>1 = Medium<br>2 = Large<br>3 = Extra Large<br>F (Flash)<br>0 = no flash<br>1 = slow<br>2 = fast<br>C (Color) 1–4 |
| DSC | Product Description | Product description for the product ID associated with the device and location specified in the message. Location is identified by the arrow direction. | Display attributes for the product:<br>F (Flash)<br>0 = no flash<br>1 = slow<br>2 = fast<br>If not provided, assume solid display.<br>C (Color) 1–4<br>L (Label) screen display label for this info (Part Desc., Product Desc, etc.). |
| IFTP | Image FTP File | FTP file name of the image associated with the device and location specified in the message. PTD client will use FTP to connect to the server and download the image file. Location is identified by the arrow direction. | A (IP Address) (default = Host IP address)<br>P (Path) (default = login directory) |
| IND | Indicator light illumination | Values are:<br>0 = No illumination<br>1 = Solid - default<br>2 = Flash<br>3 = Rapid flash<br>If tag is not provided, indicator light is illuminated. | N/A |
| ITS | Presence of instruction text lines, Header level tag | When ITS is supplied, one or more IT tags are supplied as well. This is a node, not an element. Holds a collection of IT tags. | N/A |
| IT | Instruction text details | Instruction text may contain any textual information.<br>If tag is not provided or empty, nothing displays, no illumination. | F (Flash)<br>0 = no flash<br>1 = slow<br>2 = fast<br>If not provided, assume solid display.<br>C (Color) 1–4<br>L (Line) line number of display |
| LOT | Lot Number | Alphanumeric Lot number stored at the location. Location is identified by the arrow direction. | Display attributes for the product:<br>F (Flash)<br>0 = no flash<br>1 = slow<br>2 = fast<br>If not provided, assume solid display.<br>C (Color) 1–4<br>L (Label) screen display label for this info (lot number, batch number, etc.). |
| NDI | New Device ID | New PTD device IP address for the 'Set ID' command. | P (Port) (default = 1357) |
| PID | Product ID | Alphanumeric product ID associated with the device and location specified in the message. Location is identified by the arrow direction. | Display attributes for the product:<br>F (Flash)<br>0 = no flash<br>1 = slow<br>2 = fast<br>If not provided, assume solid display.<br>C (Color) 1–4<br>L (Label) screen display label for this info (Part #, Product ID, SKU, etc.). |

TABLE 1-continued

Host to PTD Device

| Tag | Tag Description | Data | Attribute |
| --- | --- | --- | --- |
| PLY | Play Audio/Video | This tag specifies if the product audio/video should be played.<br>Values:<br>0 = Do not play (default)<br>1 = Play audio at task complete time<br>2 = Play audio to alert attention<br>3 = Play video at task complete time<br>4 = Play video to alert attention<br>If tag is not provided, no audio/video plays automatically. May still be initiated through menu option. | N/A |
| POS | Position | This tag has several uses:<br>Cell for light tower or sort bar.<br>May also be used to indicate pick position. Typically 1–3 characters.<br>May also be used to indicate operator with work at this location in the event multiple operators are picking in an area.<br>If tag is not provided or empty, no position data displays. | F (Flash)<br>0 = no flash<br>1 = slow<br>2 = fast<br>If not provided, assume solid display.<br>C (Color) 1–4 |
| QTY | Quantity | Quantity to be picked/put at the location.<br>If quantity tag is not supplied or empty, no quantity displays. If 'A' attribute is not supplied, only the "−" or down adjustment button is active. | A (Adjustment)<br>0 = Down only-default<br>1 = Adjust up & down<br>2 = Adjust up only<br>3 = No adjustments allowed.<br>F (Flash)<br>0 = no flash<br>1 = slow<br>2 = fast<br>If not provided, assume solid display.<br>C (Color) 1–4 |
| SCR | Screen Layout | Specifies screen layout to be utilized.<br>1 = Default screen, TOP<br>2 = Default screen, BOTTOM<br>3 = Default screen, LEFT<br>4 = Default screen, RIGHT<br>9 = Text screen<br>13 = Display Tower screen, left<br>14 = Display Tower screen, right<br>21 = TOP Put<br>22 = BOTTOM Put<br>23 = LEFT Put<br>24 = RIGHT Put<br>25 = NE (points north east) Put<br>26 = NW (points north west) Put<br>27 = SE (points south east) Put<br>28 = SW (points south west) Put<br>31 = TOP Count<br>32 = BOTTOM Count<br>33 = LEFT Count<br>34 = RIGHT Count<br>35 = NE (points north east) Count<br>36 = NW (points north west) Count<br>37 = SE (points south east) Count<br>38 = SW (points south west) Count<br>If tag is not provided, ARW based default screen layout will be utilized. When supplied with "Set Location" identifies default screen. | B (Background color) 1–4 |
| SFTP | Screen FTP File | FTP file name of the image associated with the required screen specified in the message. (SCRxx.XML where XX = screen layout number in SCR tag) PTD client will use FTP to connect to the server and download the image. | A (IP Address) (default = Host IP address)<br>P (Path) (default = login directory) |
| TC | Task Complete | Indicates whether the task complete button on the device is active.<br>0 = Yes (default)<br>1 = No<br>If tag is not provided or empty, both task complete button and auxiliary input are active. | B (Button)<br>1 = Auxiliary input is inactive (default)<br>2 = Button is inactive<br>3 = Both auxiliary and button are inactive |

TABLE 1-continued

Host to PTD Device

| Tag | Tag Description | Data | Attribute |
| --- | --- | --- | --- |
| TDI | Troubleshooting Device ID | IP address where devices should send unsolicited status messages. Host will send at initial set up. Host will have a service monitoring unsolicited error messages via a TCP socket. | P (Port) (default = 1359) |
| TMR | Timer | Applies to operation 11 (sleep). Amount of time sleep in seconds. | N/A |
| VFTP | Video FTP File | FTP file name of the video file. PTD client will use FTP to connect to the server and download the video. | A (IP Address) (default = Host IP address)<br>P (Path) (default = login directory) |

Some notable commands from Table 1 that are sent from the host 102 will be described below. For the sake of brevity, not all of the tags and/or their attributes will be described in detail. Instead, please refer to Table 1 for a detailed description of the tags and their attributes. The source identification ("SID") and Device identification ("DID") tags provide the network address for the host 102 and the PTD device 106, respectively. The operation tag ("OP") is used to instruct the PTD device 106 what operation to perform. Typically, the source identification, device identification and operation tags are sent in every communication from the server 102 to the PTD device 106. The host to PTD device ("HTP") tag or element is used signify messages sent from the host 102 to the PTD device 106, and the PTD device to host tag ("PTH") tag is used in communications from the PTD device 106 to the host 102.

Within the operation tag, a number of operational commands can be sent. For example, the ping command ("7") can be sent to query and receive status information from one or more PTD devices 106 on the system 100. When sent, the reset command ("8") clears the memory 204 of one or more PTD devices 106 on the system 100. To send pick instruction to the PTD device 106, the pick command ("1") is used, and the put command ("2") is used for sending put away instructions to the PTD device 106. The count command ("4") is used in providing instruction for counting of items at a particular location, and the illuminate command ("3") is sent to illuminate the indicator light 206 and/or image display 208 of a selected PTD device 106. As will be described in greater detail below, the host 102 sends the set location command ("9") to download screen information, location product ID, product description, image, video and/or audio data to the PTD device 106 for a particular location. When the test command ("10") is sent from the host 102, one or more of the PTD devices 106 perform a self-diagnostic test and return status messages to the host 102. The set identification command ("11") sets the network address for a designated PTD device 106, and in return, the PTD device 106 sends to the host 102 a status response, which provides the status of the PTD device 106. The generic FTP command ("13") instructs the PTD device 106 to download files from the host 102 or another computer.

Some other tags that can be sent by the host 102 include the audio transfer ("AFTP"), image transfer ("IFTP"), screen transfer ("SFTP") and the video transfer ("VFTP") commands, which are used to identify the network addresses of audio, image, screen and video files to be downloaded onto the PTD device 106. The quantity tag ("QTY") is used to indicate the quantity to be added or removed from a designated storage location 402. The arrow tag ("ARW") denotes the location arrow 328 to display and signifies a particular storage location 402, which in turn is used for storing item information in memory 204. For example, if an arrow tag value of five ("5") is sent to the PTD device 106, the location arrow 328 on the PTD device 106 would point toward the upper right corner storage location 402 (in a northeast direction), as is shown in FIG. 3. In this example, the item information associated with the northeast storage location 402, such as product description and instructions, would be stored in memory 204 under the number five ("5") or northeast pointing location arrow 328. It is contemplated that in other embodiments the arrow tag value can signify the angular orientation of the location arrow 328 (in degrees or radians). Below in Table 2 is an example of an XML message that is sent by the host 102 to request the PTD device 106 to show a pick four ("4") instruction with the location arrow 328 pointing in a northeast direction (see, FIGS. 3 and 4).

TABLE 2

```
<?xml version="1.0" encoding="utf-8"?>
<HTP xmlns="HTP.XSD">
    <SID>10.0.0.134</SID>
    <DID>10.0.0.135</DID>
    <OP>1</OP>
    <ARW>5</ARW>
    <QTY>4</QTY>
</HTP>
```

In the above example, the number one ("1") in the operation tag indicates that a "pick" operation needs to be performed, and the arrow tag value of five ("5") indicates that the pick operation should occur at the northeast storage location 402. The number four ("4") in the quantity tag signifies that four (4) items should be picked from the bin 404 at the northeast storage location 402. In response to receipt of this message, the processor 202 of the PTD device 106 will display the "pick" instruction 324, the number four ("4") as the quantity value 326 and the northeast pointing location arrow 328 on the image display 208, as is shown in FIG. 3. By default, if additional information concerning the storage location 402 is stored in memory 204, such as a product description or an image of the product, the processor 202 of the PTD device 106 will display on the image display 208 the additional information. In the example illustrated in FIG. 3, the additional information for the northeast pointing location arrow 328 includes an image 320 of a bolt and a "bolt" product description 322.

Referring again to Table 1, the product description tag ("DSC") is used to supply a description of the product for a particular location, which is indicated by the location arrow

328. The indicator light ("IND") tag is used to control the illumination of the indicator light 206. The instruction text presence ("IT") and details ("ITS") are used to display instructions on the image display 208 of the PTD device 106. A lot number for a particular storage location (designated by the given location arrow) is indicated with the lot number tag ("LOT"). The new address identification ("NDI") tag is used to set a new network address for a PTD device 106. Products can be identified through the product identification tag ("PID"). The host 102 can control the playing of audio, video and/or other types of files via the play ("PLY") tag. In Table 1, the position tag ("POS") can have several uses. One use includes, indicating a cell for a light tower or sort bar. The position tag can also indicate a pick position or an operator where multiple operators are at the same location.

With reference to FIG. 3, the layout of the screen displayed on the image display 208 can be controlled via the screen tag ("SCR"). The screen layouts can specify the location, size, color and animation of text and arrows. Further, the screen layouts can specify the location and size of images displayed on the screen. In the PTD device 106, the host 102 can control the operation of the task complete button through the task complete tag ("TC"), and the time that the PTD device 106 remains in sleep mode can be controlled through the timer tag ("TMR"). The host 102 can conduct troubleshooting of PTD devices 106 through the troubleshooting tag ("TDI"). Table 3, below, summarizes the tags that can be used with each of the operation commands.

TABLE 3

| Operation | Tags |
|---|---|
| 1 = Pick | ARW. Arrow direction |
| | IND. Indicator Light |
| | POS. Position |
| | QTY. Quantity |
| | TC. Task complete enabled |
| | IT. Instruction text |
| | SCR. Screen layout to be used |
| | PLY. Play audio/video |
| 2 = Put | ARW. Arrow direction |
| | IND. Indicator Light |
| | POS. Position |
| | QTY. Quantity |
| | TC. Task complete enabled |
| | IT. Instruction text |
| | SCR. Screen layout to be used |
| | PLY. Play audio/video |
| 3 = Illuminate | IND. Indicator Light |
| | IT. Instruction Text |
| | SCR. Screen layout to be used |
| 4 = Count | ARW. Arrow direction |
| | IND. Indicator Light |
| | POS. Position |
| | QTY. Quantity |
| | TC. Task complete enabled |
| | IT. Instruction text |
| | SCR. Screen layout to be used |
| | PLY. Play audio/video |
| 7 = Ping | N/A |
| 8 = Reset | N/A |
| 9 = Set Location | AFTP. Audio FTP path |
| | ARW. Arrow to indicate location |
| | DSC. Product description |
| | IFTP. Image FTP path |
| | IT. Instruction text |
| | LOT. Lot number |
| | PID. Product ID |
| | SCR. Default screen layout |
| | VFTP. Video FTP path |
| 10 = Self Test | N/A |
| 11 = Sleep | TMR. Sleep timer |
| 12 = Set ID | NDI. New PTD device IP address |
| | TDI. Diagnostic Manager device IP address |
| 13 = Generic FTP | SFTP. Screen layout FTP path |

By combining the above-described tags in a message, the host 102 can supply a myriad of instructions to the PTD device 106.

In Table 4 below, examples are shown of some tags for messages that can be sent by the PTD devices 106 to the host 102, according to one embodiment. It again should be appreciated that other types of communication protocols can be used.

TABLE 4

| PTD Device to Host | | | |
|---|---|---|---|
| Tag | Tag Description | Data | Attribute |
| | | REQUIRED TAGS | |
| SID | Source ID | TCP/IP address for source of message. Required tag. | N/A |
| DID | Device ID | TCP/IP address for destination device. Required tag. | N/A |
| OP | Operation | Operation values: 5 = Complete. Task complete. 6 = Status. Initiated by PTD. 7 = Set Up. Required tag. OPTIONAL TAGS | N/A |
| AQT | Actual Quantity | Actual quantity picked/put at the location. | N/A |
| DST | Device status | Values are: 0 = Device OK 1 = Error condition If device status is 1, ECS and EC tags are provided. | N/A |
| ECS | Presence of error conditions. | When ECS is supplied, one or more EC tags are supplied as well. This is a node, not an | N/A |

TABLE 4-continued

PTD Device to Host

| Tag | Tag Description | Data | Attribute |
|---|---|---|---|
| | Header level tag | element. Holds a collection of EC and ETX tags. | |
| EC | Error condition details | One or more error conditions may be present. Values are:<br>1 = Invalid device<br>2 = Battery low<br>3 = Display unit problem<br>4 = Stuck task complete button<br>5 = Invalid message format<br>6 = Set ID failed<br>7 = Lost power to device<br>8 = Lost network connection<br>9 = FTP transfer error<br>etc. | N/A |
| ETX | Error text | Text information about an error condition. | EC (Error Condition) |
| OQT | Original Quantity | Original quantity requested to be picked/put at the location. | N/A |

The source identification ("SID") and device identification ("DID") tags, which provide network address information, are similar to the ones described above for the host 102. The operation tag ("OP") is used to send operational indicators to the host 102. These operational indicators include a task complete indicator ("5"), a status indicator ("6") and a set up indicator ("7"). Once a task is complete, such as when an operator pushes the task complete button 306, the PTD device 106 sends a message that contains the task complete indicator. The status indicator provides information about the status of the PTD device 106, and the set up indicator is used in setting up the PTD device 106. In the embodiment of Table 4, each message the PTD device 106 sends to the host 102 needs to include the source identification, device identification and operation tags. However, it should be appreciated that in other embodiments the messages can be required to contain other types of information and/or instructions.

The status of the PTD device 106 and any error conditions in the PTD device 106 are communicated through a device status tag ("DST"), which indicates whether or not the PTD device 106 is operating properly. When the device status tag indicates that an error in the PTD device 106 has occurred ("1"), the error condition header tag ("ECS") as well as one or more error condition detail tags ("EC") are sent in the message to tell the host 102 what errors occurred. Optionally, an error text tag ("ETX") can be supplied to provide text for the error condition.

Some other tags that the PTD device 106 can send in a message include an actual quantity tag ("AQT"), which indicates the actual quantity of items picked/put (or counted) at a location, and an original quantity tag ("OQT"), which indicates the original quantity the host 102 requested. A sample "task complete" message from the PTD device 106 in response to the sample "pick" message from the host 102, which was described above with reference to FIGS. 3 and 4, is provided below in Table 5.

TABLE 5

```
<?xml version="1.0" encoding="utf-8"?>
<PTH xmlns="PTH.xsd">
    <SID>10.0.0.135</SID>
    <DID>10.0.0.134</DID>
    <OP>5</OP>
```

TABLE 5-continued

```
    <OQT>4</OQT>
    <AQT>4</AQT>
</PTH>
```

In the above discussed example, the host 102 sent a message instructing the PTD device 106 to display a "pick 4" instruction along with a northeast pointing location arrow 328 on the image display 208. For this sample message, the operator picked four (4) from the designated location, and therefore, did not need to change the displayed quantity value 326. If quantity actually picked was different from the quantity requested, the operator can press the first 308 or second 310 menu buttons to increase or decrease the quantity. After the operator has completed the task, the operator can press the task complete button 306 on the PTD device 106. Once the task complete button 306 is pressed, the processor 202 in the PTD device 106 generates and sends the above message to the host 102. In the sample message, the PTD device 106 indicates with the original quantity tag that the host requested four ("4") items to be picked and with the actual quantity tag that four ("4") items were indeed picked. If the operator adjusted the actual quantity picked to a different value, the actual quantity tag would contain the different value. Although the above example was described with reference to a pick service operation, it should be appreciated that the above sample messages, with some slight modifications, would be equally applicable for put or count instructions.

As noted above, each location arrow 328 is associated with a particular storage location 402 such that information concerning an item at a storage location 402, such as product information or handling instructions, is stored in memory 204 of the PTD device 106 in association with the particular location arrow 328. So for example in FIGS. 3 and 4, when bolts are stored in the upper right corner (northeast) bin 404, the information for the bolts is saved in memory 204 in association with the northeast pointing location arrow 328 (arrow number "5" in Table 1). For example, the product information can include a picture of the bolt, a video/animation showing the bolt being removed from the bin 404, a voice recording on how to handle the bolt, a part number for the bolt, and text that provides instructions for the bolt.

Figure 6:
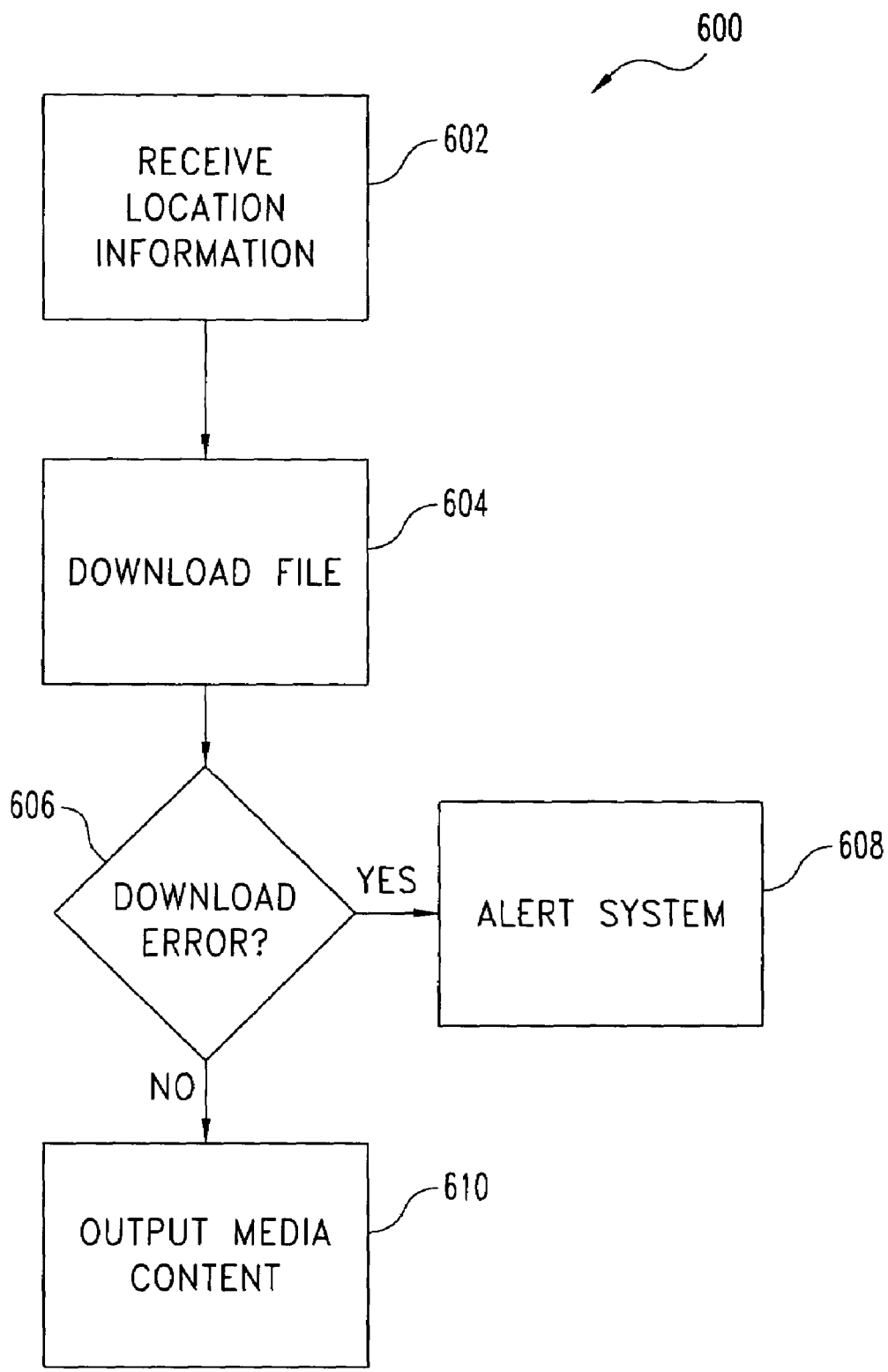
FIG. 6 is a flow diagram illustrating one technique for outputting media content with the FIG. 3 PTD device.

Referring to FIG. 6, to store information about a designated storage location 402 in memory 204, the host 102 in stage 602 sends a set location information message to the PTD device 106. A sample set location message from the host 102 that sets the location information for the bolt is provided below in Table 6.

TABLE 6

```
<?xml version="1.0" encoding="utf-8"?>
<HTP xmlns="HTP.XSD">
    <SID>10.0.0.134</SID>
    <DID>10.0.0.135</DID>
    <OP>9</OP>
    <ARW>5</ARW>
    <PID>10-3432</PID>
    <DSC>Bolt</DSC>
    <AFTP P="ASAP_SERVER\SOUND\">10-3432.WAV</AFTP>
    <IFTP P="ASAP_SERVER\IMAGES\">10-3432.JPG</IFTP>
    <VFTP P="ASAP_SERVER\VIDEO\">10-3432.AVI</VFTP>
</HTP>
```

In stage 602, the processor 202 of the PTD device 106 receives the set location information message from the host 102 and stores the message content in memory 204. As mentioned above, the product information is stored in memory 204 in association with the location arrow 328 designated in the message. After receiving the above set location message, the processor 202 of the PTD device 106 stores in memory 204 under location arrow number "5" (northeast pointing arrow) the product ID "10-3432" and the product description "bolt". As will be described in greater detail below, in one embodiment, the processor 202 stores in memory 204 under the northeast location arrow 328, the network address/path for the sound file from the audio tag ("AFTP"), the network address/path for the image file from the image tag ("IFTP") and the network address/path for the video file from the video tag ("VFTP"). In another embodiment, the sound, image and video files are directly stored in memory 204 in association with the northeast pointing location ("5") arrow 328.

In stage 604, the processor 202 of the PTD device 106 downloads the files from the host 102 and/or from other file sources. As should be appreciated, the files can be downloaded from a number of sources, including the host 102 and/or file servers that are accessible to the PTD device 106. In one form of the present invention, the PTD device 106 in stage 604 downloads the files using the file transfer protocol (FTP). In this form, the PTD device 106 logs in as an "anonymous" user and uses the IP address of the PTD device 106 as the password. The transfers occur in binary mode. However, it should be appreciated that the files can be downloaded in other manners as would occur to those skilled in the art. If during stage 606, the processor 202 of the PTD device 106 determines that an error occurred during downloading of the files, the processor 202 sends a message to the host 102 that an error has occurred during downloading in stage 608. On the other hand, if no errors occur during downloading, the PTD device 106 outputs the media content from the files via the image display 208 and/or speaker 214.

As mentioned above, in one embodiment, only the network addresses/paths (i.e., the IP address and/or path) for the sound, image and/or video files are stored in memory 204 under the location arrow, and these media content files are downloaded (stage 604) on an as needed basis so as to conserve memory. If for example the PTD device 106 in this embodiment received the above sample message, the processor 202 would then store under the northeast pointing ("5") location arrow 328 the following file names/paths in memory 204: "ASAP_SERVER\SOUND\10-3432.WAV"; "ASAP_SERVER\IMAGES\10-3432.JPG"; and "ASAP_SERVER\VIDEO\10-3432.AVI". Afterwards, when the PTD device 106 receives instructions that require one or more of the files, the files are then downloaded at that time. The operator or host 102 can send the instructions to the PTD device 106 to initiate the download process. For example, when the PTD device 106 receives the "pick 4 from the northeast location" sample message, which was described above with reference to FIG. 3, the processor 202 then downloads and displays/plays the sound, image and/or video files for the northeast ("5") location arrow 328 (stage 610). In another example, the operator can navigate through the menus on the image display 208 to request that the image for the product in the northeast bin 404 be displayed (stage 610).

In another above-mentioned embodiment, the sound, image and/or video files are downloaded (stage 604) into memory 204 immediately after the set location message is received. These downloaded media content files are then stored in memory 204 under the location arrow 328 designated in the message so that the files are immediately available on the PTD device 106. The files in memory 204 can be later used to communicate instructions and/or other information to the operator. For instance, when the above-discussed "pick 4 from the northeast location" message is received, the processor 202 of the PTD device 106 retrieves the image file stored under the northeast pointing location arrow ("5") and displays the image 320 of the bolt on the image display 208 (FIG. 3). As should be appreciated that in other embodiments the operator, through the menu system, can directly view or listen to the media content stored in memory 204. It completed that in further embodiments a combination of the network path storage and direct file storage in memory 204 embodiments can be utilized.

In stage 610, the media content files can be displayed and/or played with the PTD device 106 automatically or through user input. As discussed above, the operator can input instructions to view the media content via the keypad 210, microphone 212 and/or in other manners. For instance, the operator can navigate with the menu buttons 304 the menu system displayed on the image display 208 in order to display an image of the product. The host 102 can also send a message that requires the one or more of the files. As noted above, the PTD device 106 in one embodiment defaults to displaying or playing the files stored in memory 204 for a designated location arrow 328 when a service command, such as "pick," "put" or "count", is received. In a second embodiment, the PTD device 106 needs a specific instruction from the host 102 before displaying or playing the files. The PTD device 106 can also be configured to display/play certain files by default and require specific commands to display/play the remaining files. For example, in a third embodiment, the PTD device 106 automatically displays image files; while at the same time requires explicit commands before playing the sound and video files. A sample message from the host 102 for the third embodiment is provided below in Table 7.

TABLE 7

```
<?xml version="1.0" encoding="utf-8"?>
<HTP xmlns="HTP.XSD">
    <SID>10.0.0.134</SID>
    <DID>10.0.0.135</DID>
    <OP>1</OP>
    <ARW>5</ARW>
```

TABLE 7-continued

```
      <QTY>4</QTY>
      <IND>2</IND>
      <PLY>1</PLY>
      <PLY>4</PLY>
   </HTP>
```

When the PTD device 106 receives this "Pick 4" message, the processor 202 will flash the indicator light 206 because the indicator tag ("IND") has a value of two ("2"). In addition, the PTD device 106 will play the "10-3432.AVI" video file and the "10-3432.WAV" sound file. By default, the image of the product in the "10-3432.JPG" file is displayed on the image display for the northeast arrow ("5") product location.

Figure 7:
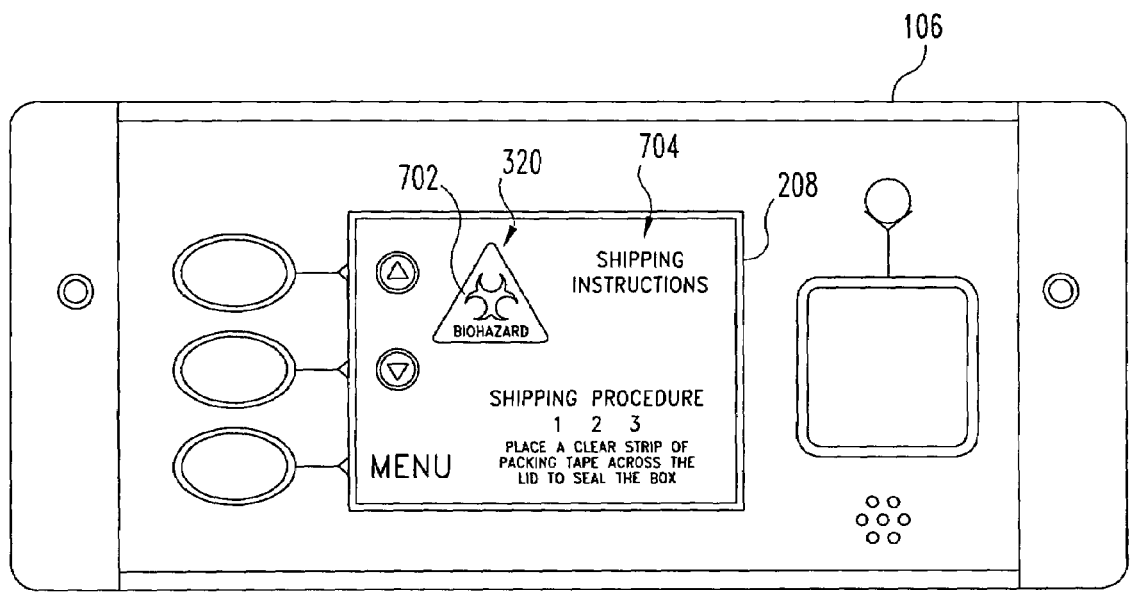
FIG. 7 is a front view of the FIG. 3 PTD device displaying a biohazard screen.

As noted above, having the ability to display images or videos of the product at the PTD device 106, helps to minimize the risk of the operator picking, placing or counting the wrong product. As shown in FIG. 3, the image 320 and description for a bolt along with the location arrow 328 is displayed on the image display 208. With the image display 208, the operator compares the actual item being serviced with the image 320 of the item, and if the two do not match, the operator can take the appropriate corrective measures. The image 320 displayed on the image display 208 can be two-dimensional or three-dimensional image. When the image is three-dimensional, the operator is able to move or rotate the image 320 product via the menu keys 304. Hands free instructions or guidance can be supplied by the audio file, which can include voice instructions, being played on the speaker 214. Furthermore, additional content, such as handling or shipping instructions, can be supplied via the image display 208 and/or speaker 214 of the PTD device 106. An example of a shipping instruction screen is depicted in FIG. 7. In the FIG. 7 example, the image 320 displayed on the image display 208 is of a biohazard symbol 702 to alert the operator of the dangers associated with the item. In addition, handling instructions 704 is displayed on the image display 208. It should be recognized from the previous discussion that the PTD device 106 is capable of generating other types of screens, in addition to those described above.

While specific embodiments of the present invention have been shown and described in detail, the breadth and scope of the present invention should not be limited by the above described exemplary embodiments, but should be defined only in accordance with the following claims and their equivalents. All changes and modifications that come within the spirit of the invention are desired to be protected.

What is claimed is:

1. A method, comprising:
providing a pick/put to display device with an image display and an indicator light;
illuminating the indicator light to alert an operator of a service to be performed on an item at a storage location;
displaying a service instruction for the item on the image display;
displaying an image of the item on the image display;
displaying an arrow that points towards the storage location on the image display;
displaying a second arrow on the image display that points towards a second storage location for a second item; and
displaying an image of the second item at the second storage location on the image display.

2. The method of claim 1, wherein said displaying the arrow, said displaying the service instruction and said displaying the image of the item occur at the same time.

3. The method of claim 1, wherein said displaying the image of the item occurs after said illuminating the indicator light.

4. The method of claim 1, wherein said displaying the image of the item includes showing a three-dimensional image on the image display.

5. The method of claim 1, wherein said illuminating the indicator light includes flashing the indicator light.

6. The method of claim 1, wherein the image includes a static picture of the item.

7. The method of claim 1, further comprising:
receiving operator input with the pick/put to display device; and
wherein said displaying on the image display the image of the item occurs in response to said receiving operator input.

8. The method of claim 1, further comprising
wherein the pick/put to display device is operatively coupled to a server through a network; and
receiving from the server a message concerning the item; and
wherein said displaying on the image display the image of the item occurs in response to said receiving from the server the message.

9. The method of claim 1, wherein said displaying the image of the item includes showing a moving image on the image display.

10. The method of claim 9, further comprising:
wherein the pick/put to display device includes a speaker; and
playing sound from the speaker.

11. The method of claim 10, wherein said playing sound occurs during said showing the moving image.

12. The method of claim 1, wherein the service instruction includes a pick instruction.

13. The method of claim 12, wherein the service instruction includes a quantity.

14. The method of claim 1, further comprising
wherein the pick/put to display device is operatively coupled to a server through a network; and
downloading onto the pick/put to display device a file containing the image for the item from the server.

15. The method of claim 14, further comprising:
downloading onto the pick/put to display device a sound file from the server; and
playing the sound file on a speaker of the pick/put to display device.

16. A method of reducing the number of pick/put to display devices needed for a storage area, comprising:
positioning a pick/put to display device with an image display between a first storage location and a second storage location;
displaying on the image display a first screen that includes a first arrow pointing toward the first storage location and a first instruction for servicing the first storage location; and
displaying on the image display a second screen that includes a second arrow pointing toward the second storage location and a second instruction for servicing the second storage location.

17. The method of claim 16, further comprising clearing the image display of the first screen before said displaying on the image display the second screen.

18. The method of claim 16, further comprising
receiving a message from a host over a network concerning the first storage location; and
wherein displaying on the image display the first screen occurs in response to said receiving the message.

19. The method of claim 16, wherein said displaying on the image display the first screen includes displaying a first image concerning the first storage location in the first screen.

20. The method of claim 19, wherein said displaying on the image display the second screen includes displaying a second image concerning the second storage location on the image display.

21. A system, comprising:
a pick/put to display device positioned proximal a storage location, the pick/put to display device including
a processor operable to download an instruction and an image that concern an item associated with the storage location,
memory operatively coupled to the processor,
an indicator light operatively coupled to the processor to alert an operator of a servicing task for the item at the storage location, and
an image display operatively coupled to the processor to display the instruction and the image concerning the item at the storage location;
a speaker operatively coupled to said processor; and
wherein said processor is operable to download on or more sounds concerning the item and play the sounds on the speaker.

22. The system of claim 21, wherein the memory is configured to store the image.

23. The system of claim 21, wherein said image display includes an organic light emitting diode display.

24. The system of claim 21, further comprising:
a server operatively coupled to the processor, said server being configured to store the image and being operable to send the image to the pick/put to display device.

25. The system of claim 24, further comprising:
a network operatively coupling the server to the processor, said network including a wireless network.

26. The system of claim 21, further comprising:
an input device operatively coupled to the processor to receive input from the operator.

27. The system of claim 26, wherein the input device includes a microphone.

28. The system of claim 26, wherein the input device includes one or more buttons.

29. The system of claim 21, wherein said image display is configured to display a location arrow that points to the storage location.

30. The system of claim 29, wherein said image display is configured to display a cell indicator that identifies an individual cell within the storage location.

31. A system, comprising:
a first storage location configured to store a first item;
a second storage location configured to store a second item; and
a pick/put to display device positioned between the first storage location and the second storage location to handle service instructions for both the first storage location and the second storage location, the pick/put to display device having an image display configured to display a first arrow that points toward the first storage location and a second arrow that points to the second storage location.

32. A method, comprising:
providing a pick/put to display device with an image display and an indicator light;
illuminating the indicator light to alert an operator of a service to be performed on an item at a storage location;
displaying a service instruction for the item on the image display;
displaying an image of the item on the image display;
wherein said displaying the image of the item includes showing a moving image on the image display;
wherein the pick/put to display device includes a speaker;
playing sound from the speaker; and
wherein said playing sound occurs during said showing the moving image.

33. A method, comprising:
providing a pick/put to display device with an image display and an indicator light;
illuminating the indicator light to alert an operator of a service to be performed on an item at a storage location;
displaying a service instruction for the item on the image display;
displaying an image of the item on the image display;
wherein the pick/put to display device is operatively coupled to a server through a network; and
downloading onto the pick/put to display device a file containing the image for the item from the server,
downloading onto the pick/put to display device a sound file from the server; and
playing the sound file on a speaker of the pick/put to display device.

34. A system, comprising:
a pick/put to display device positioned proximal a storage location, the pick/put to display device including
a processor operable to download an instruction and an image that concern an item associated with the storage location,
memory operatively coupled to the processor,
an indicator light operatively coupled to the processor to alert an operator of a servicing task for the item at the storage location, and
an image display operatively coupled to the processor to display the instruction and the image concerning the item at the storage location; and
wherein said image display is configured to display a cell indicator that identifies an individual cell within the storage location.

35. The system of claim 34, wherein said image display is configured to display a location arrow that points to the storage location.

36. A method, comprising:
storing a first file associated with a first storage location on a pick/put to display device, wherein the pick/put to display device includes an image display, wherein the pick/put to display device is positioned proximal the first storage location and a second storage location;
storing a second file associated with the second storage location on the pick/put to display device;
displaying on the image display of the pick/put to display device a first visual indicator that points to the first storage location;
outputting contents of the first file associated with the first storage location with the pick/put to display device;
displaying on the image display of the pick/put to display device a second visual indicator that points to the second storage location;

outputting contents of the second file associated with the second storage location with the pick/put to display device;

wherein said outputting contents of the first file includes displaying on the image display of the pick/put to display device first instructions concerning a first product stored at the first storage location; and wherein said outputting contents of the second file includes displaying on the image display of the pick/put to display device second instructions concerning a second product stored at the second storage location.

37. The method of claim 36, further comprising:

receiving a first command related to the first storage location with the pick/put to display device; and wherein said outputting contents of the first file occurs in response to said receiving the first command.

38. The method of claim 36, wherein:

the first file includes a first image associated with the first storage location; and said outputting contents of the first file includes displaying the first image on the image display of the pick/put to display device.

39. The method of claim 38, wherein:

the second file includes a second image associated with the second storage location; and said outputting contents of the second file includes displaying the second image on the image display of the pick/put to display device.

40. The method of claim 36, wherein:

the pick/put to display device includes a speaker;

the first file includes a first sound recording of first voice instructions associated with the first storage location; and said outputting contents of the first file includes playing the first sound recording of the first voice instructions associated with the first storage location with the speaker of the pick/put to display device.

41. The method of claim 40, wherein:

the second file includes a second sound recording of second voice instructions associated with the second storage location; and said outputting contents of the second file includes playing the second sound recording of the second voice instructions associated with the second storage location with to speaker of the pick/put to display device.

42. The method of claim 36, wherein the first visual indicator includes an arrow that points to the first storage location.

43. The method of claim 42, wherein the second visual indicator includes a second arrow that points to the second storage location.

44. A method, comprising:

storing a first file associated with a first storage location on a pick/put to display device, wherein the pick/put to display device includes an image display, wherein the pick/put to display device is positioned proximal the first storage location and a second storage location;

storing a second file associated with the second storage location on the pick/put to display device;

displaying on the image display of the pick/put to display device a first visual indicator that points to the first storage location;

outputting contents of the first file associated with the first storage location with the pick/put to display device;

displaying on the image display of the pick/put to display device a second visual indicator that points to the second storage location;

outputting contents of the second file associated with the second storage location with the pick/put to display device;

wherein the pick/put to display device includes a speaker;

wherein the first file includes a first sound recording of first voice instructions associated with the first storage location;

wherein said outputting contents of the first file includes playing the first sound recording of the first voice instructions associated with the first storage location with the speaker of the pick/put to display device;

wherein the second file includes a second sound recording of second voice instructions associated with the second storage location; and wherein said outputting contents of the second file includes playing the second sound recording of the second voice instructions associated with the second storage location with the speaker of the pick/put to display device.

45. The method of claim 44, wherein:

the first file further includes a first image associated with the first storage location;

said outputting contents of the first file further includes displaying the first image on the image display of the pick/put to display device;

the second file further includes a second image associated with the second storage location;

said outputting contents of the second file further includes displaying the second image on the image display of the pick/put to display device;

the first visual indicator includes a first arrow that points to the first storage location; and the second visual indicator includes a second arrow that points to the second storage location.

46. The method of claim 45, further comprising:

receiving a first command related to the first storage location with the pick/put to display device; and wherein said outputting contents of the first file occurs in response to said receiving the first command.

* * * * *

UNITED STATES PATENT AND TRADEMARK OFFICE
CERTIFICATE OF CORRECTION

PATENT NO. : 7,084,738 B2 Page 1 of 1
APPLICATION NO. : 10/643197
DATED : August 1, 2006
INVENTOR(S) : Bastian, II It is certified that error appears in the above-identified patent and that said Letters Patent is hereby corrected as shown below:

Title page 2,
OTHER PUBLICATIONS, column 2, Line 28 please change "Wireles Technology Selected for J.C. Penney State-of-the-" to -- Wireless Technology Selected for J.C. Penney State-of-the- --

OTHER PUBLICATIONS, column 2, Line 33 please change "Systenm Technologies", 2 pages." to -- System Technologies", 2 pages. --

Column 23,
Line 27, please change "wherein said processor is operable to download on or" to -- wherein said processor is operable to download one or --

Column 25,
Line 45, please change "with to speaker of the pick/put to display device." to -- with the speaker of the pick/put to display device.--

Signed and Sealed this

Fourteenth Day of November, 2006

JON W. DUDAS
*Director of the United States Patent and Trademark Office*